United States Patent [19]

Walker

[11] 4,318,520
[45] Mar. 9, 1982

[54] HINGED COVER UNIT WITH INTEGRAL HANDLE AND REMOVABLE SHELF FOR COLLAPSIBLE STAND

[75] Inventor: Ronnie H. Walker, Cypress, Calif.

[73] Assignee: Acme Wire Products Corp., Garden Grove, Calif.

[21] Appl. No.: 154,474

[22] Filed: May 29, 1980

[51] Int. Cl.³ .............................................. A63B 55/04
[52] U.S. Cl. ...................................... 248/97; 248/166; 248/175; 248/99
[58] Field of Search ...................... 248/97, 98, 99, 129, 248/150, 166, 175

[56] References Cited

U.S. PATENT DOCUMENTS

| | | | |
|---|---|---|---|
| 498,178 | 3/1895 | Leonard | 220/340 |
| 2,117,228 | 5/1938 | Stuchbery | 220/340 |
| 3,603,542 | 4/1971 | Grille | 248/129 X |
| 3,659,816 | 5/1972 | Wilson | 248/97 |
| 3,663,990 | 5/1972 | Shane | 16/269 |
| 3,806,146 | 4/1974 | Shaw | 248/98 X |
| 3,838,839 | 10/1974 | Spencer | 248/97 X |
| 3,861,125 | 1/1975 | Hagemeister | 248/99 X |
| 3,893,648 | 7/1975 | Gilbert | 248/97 |

Primary Examiner—Wayne L. Shedd
Attorney, Agent, or Firm—Christie, Parker & Hale

[57] ABSTRACT

A disposable bag is supported from two rectangular wire formed loops defining a stand which extend transversely to one another in a pivotal C-like relation. The invention provides for two horizontally disposed elements which cooperatively support a bag and stand cover when it is in an upright position. Also provided are rolling means for facilitating the transport of the stand, and an integral handle unit to enhance maneuverability. A removable shelf, to support the bottom of the shelf is also disclosed.

19 Claims, 4 Drawing Figures

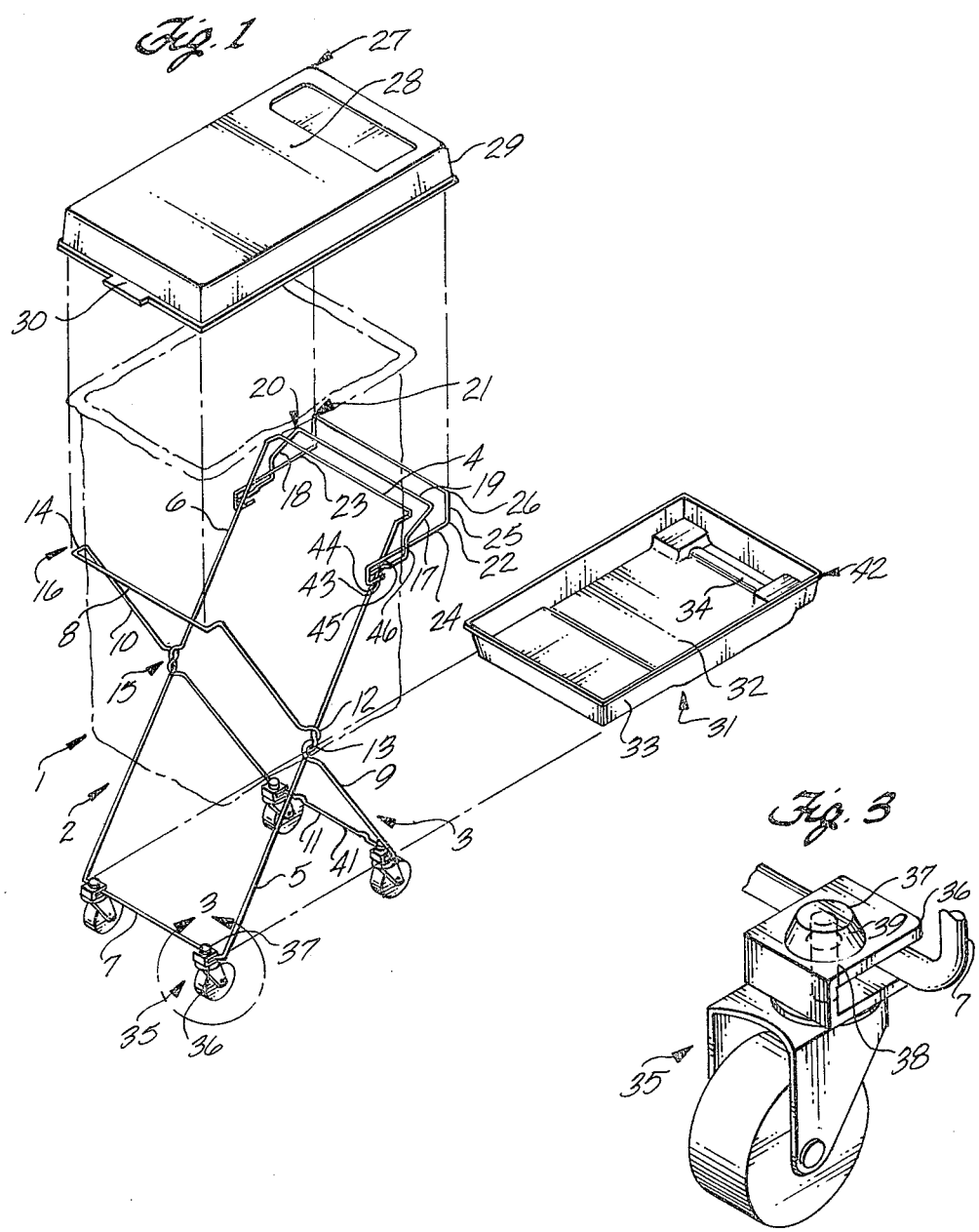

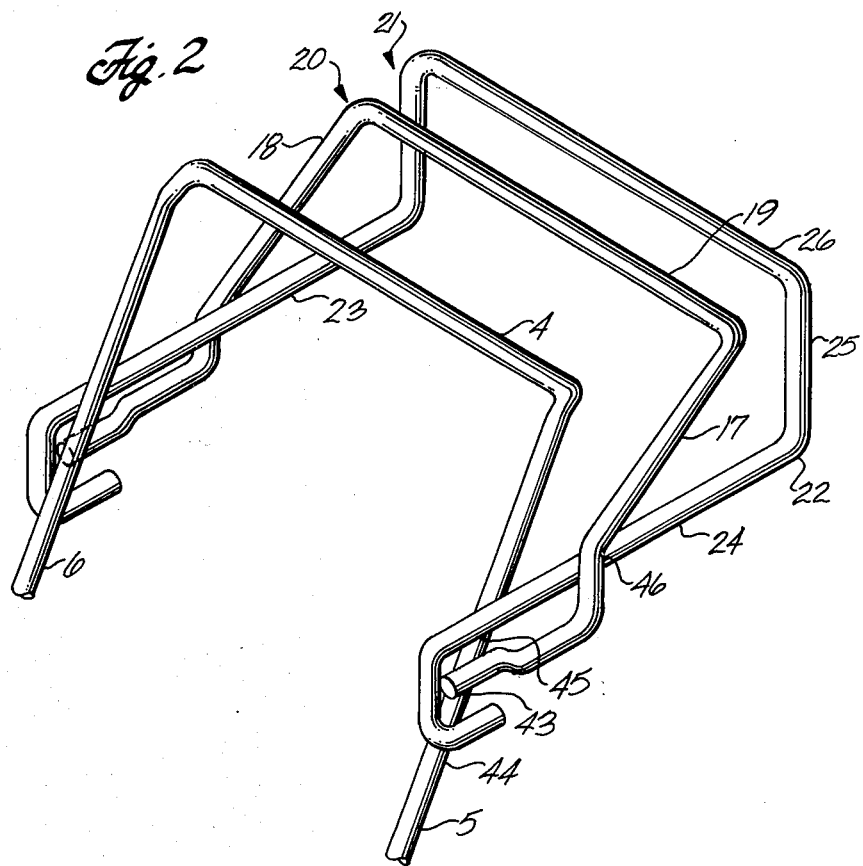
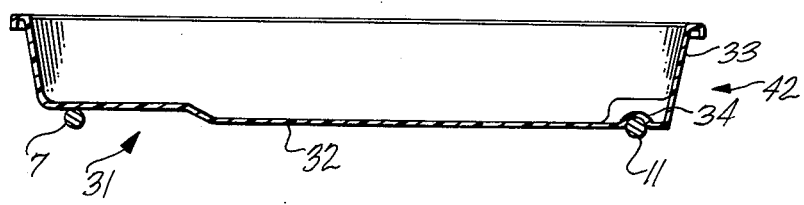

HINGED COVER UNIT WITH INTEGRAL HANDLE AND REMOVABLE SHELF FOR COLLAPSIBLE STAND

FIELD OF THE INVENTION

This invention relates to a lightweight folding stand for supporting cloth or plastic bags in a position for filling, and more specifically to improvements enhancing the mobility, safety, and sanitation of such a stand.

PRIOR ART OF INVENTION

Devices to support bags for soiled linens and trash are known in the art.

Wilson, U.S. Pat. No. 3,659,816 discloses one such device. It's constructed of two rectangular wire formed loop which extend transversely to one another in a pivotal X-like relation. Formed midway along each side of one of the wire loops is an S-shaped portion while U-shaped portions are formed in the sides of the second loop at corresponding positions. The S and U-shaped portions interlock allowing the two loops a limited rotational degree of freedom with respect to one another at that point. Wilson does not provide any means for transporting or maneuvering the stand, nor does it provide any lid, or means for supporting the bottom of the bag.

Another device to support a disposable plastic bag is disclosed in Shaw, U.S. Pat. No. 3,806,146. It comprises a grate-like stand mounted on runners or wheels. The stand supports two pairs of vertical members, each pair connected by a horizontal cross member. The lip of a disposable plastic bag is folded down over the cross members to keep the mouth of the bag open. Shaw also discloses a lid to cover the open mouth of the bag. The lid is specially formed with two spaced apart hooks which encircle a substantial portion of one of the horizontal cross members to which they are attached. The hooks and cross member act as a hinge on which the lid rotates. The lip of the plastic bag is held between the hooks and the cross-member. This requires the lid to be removed before the bag may be replaced. In addition the bag is vulnerable to perforation where the hooks contact it. This may lead to the bag slipping from the frame or to the ultimate tearing of the bag.

Another device to support a disposable bag is disclosed in Gilbert, U.S. Pat. No. 3,893,648. It is comprised of two inverted U-shaped members. The legs of the members are crossed and are pivotally connected of the cross points. The lip of a disposable plastic bag is folded down over the closed end sections of the two U-shaped members to hold the mouth of the bag open. A lid is provided to cover the open mouth of the bag. The lid is hinged to the frame by means of two clip-like tubs which extend under the lid and attach to the closed end section of one of the U-shaped members. The disposable plastic bag is again held between the clips and the frame. In addition to suffering the same disadvantages as Shaw, Gilbert provides no means of supporting the bag to prevent its rupture, for example, when filled with heavy materials.

Other types of hinges for boxes or covers are also known in the prior art. Shane, U.S. Pat. No. 3,663,990 discloses a hinge for use on the rectangular cover of a wall mounted fluorescent lighting fixture. The detachable hinge has a first member which in cross-section, resembles a boat-hook. This member is disposed along an upper horizontal edge of the cover. A second horizontal hinge member is permanently attached to a wall and presents an irregularly shaped hook-like receiving channel to the first member. The first member hooks over the receiving channel and holds the cover to the wall when the cover is in a closed position. When rotated within the receiving channel, a flange-like projection on the first member engages with a flute like depression in the irregularly shaped receiving channel. This allows the cover to be locked into an upright position, but the first hinge member must then be disengaged before the cover may be lowered. Additionally, this hinge is designed for use on a vertical surface and requires expensive machines to fabricate the irregularly shaped hinge members. It would not be adapted to an application in which the second member is mounted on a relatively small diameter horizontal rod.

Hinges of a more elementary design are disclosed in Leonard, U.S. Pat. No. 498,178 and Stockberg, U.S. Pat. No. 2,117,228. Both disclose a hinge having a first curled member affixed to the upper lip of a rectangular container. A second curled hinge member is affixed to the corresponding edge of a container cover. The first member is curled outwards and downwards from the lip of the rectangular container. The second member is attached to and curled underneath the cover, and it hooks into a channel formed by the first hinge member. As the cover is opened, the second member rotates into the channel of the first member thereby further engaging the two members. By constructing hinge members with different radii of curvature, the extent to which the first member rotates within the second may be limited, thereby limiting the degree of rotation of the second hinge member. These hinges suffer the same disadvantages as Shane in that they are ill-suited for mounting on a horizontal rod, and because they require special metal curling equipment for their fabrication.

It is a primary objective of this invention to provide a bag holder with a simple cover and hinge which does not cause perforation of the bag.

It is a further objective of this invention to provide a bag holder capable of holding bags of different diameters.

It is yet another objective of this invention to provide a disposable bag holder with means to support the bottom of the disposable bag to prevent rupture when filled with heavy items.

It is still another objective of this invention to provide a disposable bag holder with means for facilitating transport and maneuvering of the bag holder.

SUMMARY OF THE INVENTION

These and other objectives are met in the present invention which provides improvements to a collapsible stand of the type disclosed in Wilson U.S. Pat. No. 3,659,816. The invention provides for two generally rectangular wire formed loops which extend transversely to one another in a pivotal X-like relationship. The loops are joined at their points of intersection by means of a knuckle joint which permits the loops to rotate with respect to each other and achieve a limited angular separation. This defines a bag holding stand which can be selectively erected or collapsed. A flexible cloth or plastic bag may be folded down over the tops of the rectangular loops when the stand is erected thereby holding the bag mouth open for filling.

The invention provides for a rectangular cover which is dimensioned such that when it is lowered it rests upon the top of the frame and completely closes the mouth of the bag. Cover sidewalls maintain the cover over the mouth of the bag. Also provided are two wire formed cover hinge elements which extend horizontally outward from one of the rectangular loops. The two elements define a C-shaped channel region into which the rim of the cover extends when it is closed. When the cover is opened, the rim of the cover is rotated into the C-shaped channel region. The cover is supported within the region by a second of the elements and its further rotation is limited by a first of the element, which abuts on the interior surface of the rim. The disposition of the first element provides an additional cross piece over which the mouth of a larger plastic bag may be folded thereby adapting the stand to support more than one bag size.

Two pair of wheeled casters are attached to the bottoms of the rectangular loops by means of tabs welded to the loops. The casters allow the stand to be easily transported from place to place and the second hinge element may be used as a handle to facilitate the maneuvering of the stand.

A pan like shelf is also provided to support the bottom of a bag mounted on the stand and to prevent it from dragging on the floor as the stand is moved. The shelf is supported by the bottoms of the two rectangular loops upon which it rests. A cylindrical shaped channel laterally traverses the interior side of one end of the shelf and engages with one of the loop bottoms to prevent the shelf from sliding off the stand. Two protrusions extend upwardly from the loop bottom to bracket the shelf and prevent its lateral displacement.

BRIEF DESCRIPTION OF THE DRAWINGS

FIG. 1 is an exploded perspective view of the collapsible stand of the present invention showing the cover and bottom shelf members and their relationship to the stand;

FIG. 2 is a side elevation view of the cover hinge and handle assembly showing the cover in the raised and lowered positions;

FIG. 3 is an enlarged perspective view of the caster assembly used with the stand; and FIG. 4 is a sectional view showing the bottom shelf member mounted on the lower support cross bars of the stand.

DETAILED DESCRIPTION

Referring to FIG. 1, there is shown in perspective view an improved stand for supporting a plastic bag or the like. The stand comprises a frame 1, formed of a pair of essentially rectangular wire formed loops 2, 3 which extend transversely to one another in a pivotal X-like relationship. The first wire formed loop 2 comprises a top cross bar 4, a first side support 5, a second side support 6, and a bottom cross bar 7. The second wire formed loop 3 also has a top cross bar 8, a third side support 9, a fourth side support 10, and a bottom cross bar 11.

The first and third side supports 5, 9 intersect at their midpoints as do the second and fourth side supports 6, 10. First and second side supports 5, 6 have an S-shaped section 12 formed at their midpoints. In addition, third and fourth side supports 9, 10 have a U-shaped section 13 formed along their lengths at corresponding points. The U-shaped sections 13 and the S-shaped sections 12 engage with one another thereby forming a pair of knuckle joints 15 pivotally connecting the two loops 2, 3. The knuckle joints 15 allow the loops 2, 3 only a limited degree of rotation with respect to one another, thereby restricting their angular separation, and allowing the stand to be selectively erected or collapsed.

A top portion 14, of each side support 5, 6, 9, 10, is bent out of, and down from the plane of its respective wire formed loop 2, 3. The top cross bars 4, 8 are also thereby displaced out of the planes of the wire formed loops 2, 3 forming two flanges 16 which project outwardly from the top of the frame 1. When the frame 1 is erected, the open mouth of a cloth or plastic bag may be folded down over the flanges 16. A portion of the periphery of the bag mouth may then be knotted, if needed, thereby reducing the circumference of the bag mouth periphery and preventing the bag from slipping from the frame 1 as it is filled.

In the preferred embodiment, frame 1 is provided with a set of four casters 35 to facilitate the transport of the stand. Referring to FIG. 3, each caster 35 is attached to the frame 1 by means of a C-shaped tab 36, one of which is affixed to each end of the bottom cross bars 7, 11. The legs of each tab 36 surround the bottom cross bar and are attached thereto by means of a weld. The tabs 36 on opposite cross bars 7, 11 extend horizontally inward toward one another, and each is provided with a hole 39 through its entire width. A central post 38 of the caster 35 extends through the hole 39 from beneath the tab 36. A caster cap 37 is affixed to the end of each central post 38 and holds post 38 within the hole 39, and the caster 35 to tab 36.

Also provided in the preferred embodiment and shown in FIG. 4 is a removable molded plastic shelf 31, which is supported by the two bottom cross bars 7, 11. The shelf 31 holds up the bottom of the bag to prevent dragging or rupturing as it is filled. The shelf 31 is comprised of a rectangular central portion 32 circumscribed by a rim 33 which is approximately perpendicular to the central portion 32. A cylindrical channel 34 is formed in the inferior surface of the rectangular central portion 32, and laterally traverses that portion 32 proximate and parallel to one of its ends 42. The channel 34 engages with one of the bottom cross bars 7, 11 to prevent the longitudinal displacement of the shelf 31. Additionally, there may be provided two protrusions 44 extending upward from the cross bar 7, 11 spaced apart to permit the disposal of the shelf 31 there between. These protrusions 41 limit the lateral displacement of the shelf 31.

In conformity with the present invention the stand is provided with a bag cover 27 and two cover hinge elements 20, 21, to support the cover 27 when it is in an open, upright position. Element 21 acts as an integral handle for the stand.

The cover 27 comprises a rectangular central portion 28 circumscribed by a rim 29, which is approximately perpendicular to the central portion 28. The cover 27 is dimensioned such that the rim 29 extends over the two top cross bars 4, 8 and the first hinge element 20. When the cover 27 is in a closed position it is supported by the two top cross bars 4, 8 and completely covers the open mouth of the bag mounted on the stand. A handle tab 30 is provided at one end of the cover 27 as a means for opening and closing the cover 27.

Referring now to FIG. 2, the first cover hinge element 20 is made up of three components: a first and second mutually parallel arm 17, 18 respectively, and a first cross piece 19. The first and second arms 17, 18 are attached to first and second side supports 5, 6 by means of a single weld 43. The arms 17, 18 first extend out horizontally and then extend up from and diagonally out from the side supports 5, 6. The first cross piece 19 joins the distal ends of the arms 17, 18, and is parallel to the top cross bar 4 of the first loop 2.

The second cover hinge element 21 is also made up of three components: third and fourth mutually parallel L-shaped arms 22, 23 respectively and a second piece 26. A first horizontal leg 24 of each L-shaped arm 22, 23 is attached to each of first and second side supports 5, 6 by means of at least one weld. In the preferred embodiment a first point of attachment 44 of the leg 24 to the side support 5, 6 is made below the point of attachment 43 of first or second arms 17, 18.

The leg 24 is then bent in a U-shaped fashion to surround the proximal end of first and second arms 17, 18. The axis of the leg 24 again crosses the axis of first and second side support 5, 6 and is attached a second time at point 45. Leg 24 then extends horizontally outward and crosses the axis of first or second arm 17, 18 to which a third weld 46 is made. The first legs 24 extend out even further and each terminate in a second leg 24 of the third and fourth L-shaped arms 21, 23. The second legs 24 are vertically aligned and are joined at their upper ends by the second cross piece 26 which also serves as a handle to aid in maneuvering the stand.

When the bag cover 27 is closed, the rim 29 is disposed between first and second cross pieces 19, 26. The first cross piece 19 is located slightly lower than either the top cross bars 4, 8 or the second cross piece 26 which are both parallel to it. Hence, the cover is supported only by the two top cross bars 4, 8 when it is closed and the inferior surface of the cover effectively and completely closes off the entire bag mouth.

When the bag cover 27 is raised into an upright position, the rim 29 is rotated into the area defined by the two hinge elements 20, 21. The rim 29 becomes parallel with legs 24 of the third and fourth arms 22, 23 which then support the cover 27. The first and second arms 17, 18 are disposed within and abut upon the interior surface of the rim 29. Second cross piece 26 abuts upon the outside rectangular portion 28 of the cover 27 thereby limiting the backward rotation of the cover around the points of abutment of the first hinge element 20 on the rim 29. Additionally the lateral movement of the cover 27 while upright is limited by the disposition of the first hinge element 20 between the sections of the rim 29 that run along the length of the cover 27. This prevents the cover 27 from slipping off to either side while the cover 27 is upright.

A major advantage of this improved stand for supporting a large bag such as those used to receive soiled materials such as dirty laundry or trash is that it may now be used more conveniently in applications where it must be moved from place to place to collect items from different locations. The casters 35 provide easy transport over any fairly level surface and the integral handle 30 unit enhances the maneuverability of the stand.

The new cover unit 27 allows the stand to be used in locations such as hospitals, where the need to maintain a cleanly environment is paramount. The cover 27 impedes the migration of bacteria from within the plastic bag as well as excluding flying insects and reducing offensive odors. The stand can now also accomodate bags of larger circumference by folding the periphery of the bag mouth over both the top cross bars 4, 8 and hinge element 20.

The addition of a removable shelf 31 to the bottom of the stand further enhances portability by providing means to prevent the dragging or rupture of the bag as it is filled and rolled from place to place. The removability of both the shelf 31 and the cover 27 maintain the ease with which the stand may be folded up and stored to conserve space.

What is claimed is:

1. A stand for supporting a flexible bag comprising:
   a frame for supporting and holding the bag mouth open in a substantially horizontal plane;
   a cover element cooperatively engaged with the top of the frame;
   at least one first cover hinge element extending out from the frame; and
   at least one second cover hinge element extending out from the frame, beyond the first hinge element and disposed below the first hinge element;
   the first and second hinge elements being spaced at a predetermined distance relative to each other such that the hinge elements cooperatively engage and support the cover in a substantially vertical plane when the cover is pivoted to an elevated position.

2. The stand of claim 1 wherein the cover has a rectangular central portion circumscribed at least in part by a rim which is approximately perpendicular to the central portion, the cover being dimensioned such that the rim extends downwardly over at least a portion of the top of the frame including the first hinge element.

3. The stand of claim 2 wherein the frame comprises:
   at least two upwardly extending substantially parallel first and second side supports, and means for holding said side supports in a substantially vertical orientation.

4. The stand of claim 3 wherein the first hinge element comprises:
   first and second mutually parallel arms, one arm being attached to each upwardly extending first and second side support, the arms extending horizontally out from, up from, and diagonally out from the side supports; and
   a first cross piece joining the ends of the arms opposite the ends of attachment to the side supports.

5. The stand of claim 4 wherein the second hinge element comprises:
   third and fourth mutually parallel L-shaped arms;
   a first leg of one L-shaped arm being attached to each of the upwardly extending first and second side supports;
   a second leg of each L-shaped arm extending upwardly in substantial vertical alignment; and
   a second cross piece joining the ends of second legs.

6. The stand of claim 5 wherein the first cross piece is disposed intermediately between the second cross piece and the frame, and is substantially parallel to the second cross piece.

7. The stand of claim 6 wherein the first and second arms are attached to the side supports below the points of attachment of the third and fourth arms; and
   the axes of the first and second arms intersect the axes of the third and fourth arms respectively and are joined at the intersection point.

8. The stand of claim 7 wherein:
   the first and second arms are disposed within and abut upon the interior surface of the cover rim;
   the third and fourth arms support the outside surface of the cover rim; and
   the second cross piece abuts upon the outside rectangular portion of the cover;

thereby cooperatively supporting the cover in a substantially vertical plane.

9. The stand of claim 8 wherein the frame further comprises:
a pair of upwardly extending third and fourth side supports;
a pair of first and second mutually parallel top cross bars joining the ends of the first and second side supports and the ends of the third and fourth side supports respectively;
a pair of first and second mutually parallel bottom cross bars joining the opposite ends of the first and second side supports and third and fourth side supports respectively;
a first rectangular loop formed from the first pair of side supports, the first top cross bar, and the first bottom cross bar;
a second rectangular loop formed from the second pair of side supports, the second top cross bar, and the second bottom cross bar;
the first and second loops extending transversely to one another in an X-like relationship; and
means for attaching the first and second loops at the points of intersection.

10. The stand of claim 9 wherein the attaching means permit limited rotation of the loops with respect to each other about the points of intersection to allow the stand to be selectively erected and collapsed.

11. The stand of claim 10 wherein the attaching means comprises a knuckle joint.

12. The stand of claim 8 wherein the third and fourth arms have a plurality of points of attachment to the first and second side supports.

13. The stand of claim 10 additionally comprising:
handle means adjacent the top of the frame; and
rolling means for facilitating the transport and maneuvering of the stand.

14. The stand of claim 13 wherein the rolling means are casters.

15. The stand of claim 13 wherein the handle means is the second cross piece.

16. The stand of claim 9 additionally comprising:
a removable rectangular shelf supported by the first and second bottom cross bars and adapted to support the bottom of the bag.

17. The stand of claim 16 wherein the shelf comprises:
a rectangular central portion circumscribed at least in part by a rim which is approximately perpendicular to the central portion; and
a cylindrical channel traversing the bottom surface of the central portion for engaging with one lower cross bar to prevent the longitudinal displacement of the shelf.

18. The stand of claim 17 wherein said lower cross bar further comprises:
two upwardly extending protrusions spaced apart to permit the disposal of the shelf there between on the cross bar to limit the lateral displacement of the shelf.

19. A collapsible, portable stand for supporting a flexible bag or the like comprising:
a first wire-formed elongated loop of generally rectangular configuration having a bottom cross bar, first and second side supports, and a top cross bar;
a second wire-formed elongated loop of generally rectangular configuration intersecting the first loop along the direction of elongation and having a bottom cross bar, third and fourth side supports, and a top cross bar; and
means for attaching the first and second loops at their points of intersection to permit the limited rotation of the loops with respect to one another allowing the stand to be selectively erected or collapsed;
a first hinge element comprising:
a pair of first and second mutually parallel arms, one arm being attached to each first and second side supports, the arms extending horizontally out from, up from, and diagonally out from the side supports; and
a first cross piece joining the ends of the arms opposite the ends of attachment to the side supports;
a second hinge element comprising:
a pair of third and fourth mutually parallel L-shaped arms;
a first leg of one L-shaped arm being attached to each of the first and second side supports;
a second leg of each L-shaped arm extending upwardly in substantial vertical alignment; and
a second cross piece joining the upper ends of the second legs;
the third and fourth arms being attached to the first and second side supports above the point of attachment of the first and second arms;
the axes of the third and fourth arms intersecting the axes of the first and second arms respectively and being attached at the intersection points;
the first cross piece being disposed intermediately between the second cross piece and the top cross bar of the first loop, and being substantially parallel to both;
two pair of casters, one pair being attached to the bottom cross bar of the first loop in spaced relation to each other, the second pair being attached to the bottom cross bar of the second loop in spaced relation to each other;
a cover having a rectangular central portion, circumscribed at least in part by a rim which is approximately perpendicular to the central portion, the cover being dimensioned such that the rim extends over the top cross bar of each loop and the first hinge element; and
the first and second hinge elements cooperatively supporting the cover in a substantially vertical plane when the cover is pivoted to an elevated position; and
a removable rectangular shelf supported by the two bottom cross bars and adapted to support the bottom of the bag.

* * * * *